United States Patent [19]

Scrutton et al.

[11] 3,773,554
[45] Nov. 20, 1973

[54] ELECTRODES FOR ELECTROCHEMICAL PROCESSES

[75] Inventors: Anthony Scrutton; Denis Lee, both of Runcorn, England

[73] Assignee: Imperial Chemical Industries Limited, London, England

[22] Filed: Mar. 1, 1971

[21] Appl. No.: 119,892

[30] Foreign Application Priority Data
Mar. 18, 1970  Great Britain.................. 13,035/70

[52] U.S. Cl.................. 117/215, 117/217, 117/221, 117/230, 204/290 F
[51] Int. Cl............................................. B44d 1/18
[58] Field of Search................ 204/290 F; 117/215, 117/217, 221, 230

[56] References Cited
UNITED STATES PATENTS
3,663,280   5/1972   Lee.................................. 204/290 F

*Primary Examiner*—Cameron K. Weiffenbach
*Attorney*—Cushman, Darby & Cushman

[57] ABSTRACT

An electrode for use in electrochemical processes is manufactured by applying to a film-forming metal support member (preferably a titanium member) first a layer of an operative electrode material (preferably a layer of ruthenium dioxide) and then a layer of a film-forming metal oxide (preferably a layer of titanium dioxide by thermal decomposition of a coating comprising an organo-titanium compound) and optionally repeating this two-layer-application sequence at least once.

7 Claims, No Drawings

ELECTRODES FOR ELECTROCHEMICAL PROCESSES

This invention relates to electrodes for electrochemical processes. More particularly it relates to improvements in the durability of electrodes comprising a layer of operative electrode material on a support formed from a film-forming metal, especially titanium.

It is known to employ as an anode in an electrochemical cell, particularly in a cell wherein an aqueous solution of an alkali metal chloride is electrolysed, an electrode comprising a film-forming metal support, particularly a titanium support, which carries on at least a part of its surface a coating of an operative electrode material. The titanium support is resistant to anodic attack, even in the highly corrosive chloride electrolytes, but is incapable of operating as an anode since the thin film of oxide which is formed on its surface acts as a barrier layer preventing the passage of current directly into the electrolyte. The operative electrode material must be resistant to anodic attack and must also be active in transferring electrons to the electrode from the ions of the electrolyte, i.e., in distinction from the film-forming metal of the support it must be capable of operating as an electrode when immersed in the electrolyte. The operative electrode material is usually one or more of the platinum group metals and/or the oxides of these metals, but it may be any other electroconducting material which has adequate resistance to anodic dissolution in the cell and which will function as an anode.

Although the above-mentioned operative electrode materials are very resistant to electrochemical attack in a variety of corrosive media, they do wear away at an appreciable rate or even break away from the film-forming metal support in use. The present invention provides a method of anchoring the operative electrode material more securely to the support in an electrode of the aforesaid type while at the same time presenting the operative electrode surface in a form which has a low overpotential for the liberation of chlorine when the electrode is used as an anode in the electrolysis of alkali metal chloride solutions. Furthermore, electrodes prepared according to the invention have a high resistance to damage by short-circuit contact with the cathode when they are used as anodes in mercury-cathode cells.

The improved electrodes of the invention are manufactured by first preparing an electrode of the type comprising a film-forming metal support carrying a coating of an operative electrode material by a method as known in the art, or by a simple variant thereof as will appear hereinafter, then applying over the layer of operative electrode material a coating of a thermally decomposable organo-compound of a film-forming metal and heating the thus coated electrode so as to convert the organo-compound of the film-forming metal to an oxide of the film-forming metal. The consecutive steps of coating with an operative electrode material and then with an oxide of a film-forming metal may be repeated at least once more so as to lay down a sequence of alternating layers of operative electrode material and film-forming metal oxide amounting to at least four layers in all, with advantages as will appear hereinafter.

In its broadest aspect therefore the present invention provides a method for the manufacture of an electrode for use in electrochemical processes, which comprises the steps of (1) applying to a support member made of a film-forming metal a layer of an operative electrode material, and (2) applying over the said layer a coating comprising a thermally decomposable organo-compound of a film-forming metal in a liquid vehicle and heating the coating so as to convert the organo-compound of the film-forming metal to an oxide of the film-forming metal.

In a preferred embodiment of the method of the invention the sequence of the steps (1) and (2) is repeated at least once so as to lay down a sequence of alternating layers of operative electrode material and film-forming metal oxide on the support member. We have found that an electrode prepared according to this embodiment has a further enhanced resistance to damage by short-circuit contact with the cathode when it is used as an anode in a mercury cell, as shown by the fact that after contact of the anode with the cathode in a working cell the cell voltage rises more slowly with time and there is a less rapid loss of anode coating from the film-forming metal support. Preferably the sequence of steps (1) and (2) is carried out a sufficient number of times to produce a total coating of operative electrode material and film-forming metal oxide on the film-forming metal support in the range 10–15 g/m$^2$ of the coated surface.

The finished coating has a smooth vitreous appearance and excellent adhesion to the metal of the support. The two-step coating method of the invention (with optional repetition of the two steps) enables this coating containing a film-forming metal oxide to be produced at a temperature below the melting point of the film-forming metal oxide and in fact at temperatures below the melting points of glasses that oxides of film-forming metals form with other oxides. This is important since it enables high temperatures at which the metal of the support would react appreciably with the coating or with oxygen of the atmosphere to be avoided during the coating operation.

Although the electrode coatings have a smooth vitreous appearance it is apparent that the outermost layer of film-forming metal oxide produced by the method of the invention is not an impervious dielectric layer, since the electrodes are capable of carrying a high density of current into an electrolyte at low cell voltage.

The present invention also provides, therefore, an electrode for use in electrochemical processes which comprises a support member made of a film-forming metal carrying a coating which comprises a layer of an operative electrode material and superimposed thereon a layer of an oxide of a film-forming metal.

A preferred form of the electrode comprises a support member made of a film-forming metal having deposited thereon a multi-layer coating consisting of an alternating sequence of a layer of an operative electrode material and a layer of a film-forming metal oxide, the innermost layer being operative electrode material, the outermost layer being film-forming metal oxide and the total number of layers being at least four.

Although the electrodes of the invention are produced by forming at least two distinct coating layers on the film-forming metal support — first a layer of operative electrode material and afterwards a film-forming metal oxide — we do not exclude from the scope of the invention electrodes in which there is some interpenetration between the different coating layers. Indeed it seems likely that at the temperatures employed to form the coating of film-forming metal oxide by decomposition of an organo-compound of the metal some interdiffusion of the layers will take place, and this may be the explanation of the high mechanical strength of the electrodes of the invention.

In this specification, by "a film-forming metal" we mean one of the metals titanium, zirconium, niobium, tantalum or tungsten or an alloy consisting principally of one of these metals and having anodic polarisation properties similar to those of the pure metal. It is preferred to use as support material in the electrode titanium alone or an alloy based on titanium and having anodic polarisation properties similar to those of titanium. Examples of such alloys are titanium-zirconium alloys containing up to 14 percent of zirconium, alloys of titanium with up to 5 percent of a platinum metal such as platinum, rhodium or iridium and alloys of titanium with niobium or tantalum containing up to 10 percent of the alloying constituent.

The operative electrode material of the electrode may be one or more of the platinum group metals, i.e., platinum, rhodium, iridium, ruthenium, osmium and palladium, and/or the oxides thereof, or another metal or a compound which is resistant to electrochemical dissolution in the cell where it is to be employed and will function as an electrode, for instance rhenium, rhenium trioxide, manganese dioxide, magnetite, titanium nitride and the borides, phosphides and silicides of the platinum group metals. The preferred operative electrode materials are the oxides of the platinum group metals, particularly ruthenium dioxide, and mixtures of one or more platinum group metals with the oxides thereof. The invention will be further described by reference to the use of these preferred operative electrode materials but is not limited thereto.

The method employed for forming a layer of the platinum group metal oxide or a mixture of a platinum group metal and the oxides thereof on a support of a film-forming metal may suitably be one of those known in the art. The same methods may suitably be employed for depositing further layers of the platinum group metals and/or oxides on film-forming metal oxide layers when building up multi-layer coatings. According to the British Patent Specification No. 984,973 for example, a coating of a platinum metal may be formed on a titanium support by applying to the chemically-cleaned support a plurality of coatings of a platinum-bearing preparation comprising a platinum metal compound in an organic vehicle and containing a reducing agent, e.g., an essential oil, and heating each coating in an oxidising atmosphere, e.g., air, at a temperature between 350° and 550°C. The platinum metal compounds may be thermally-decomposable inorganic compounds, resinates or sulphoresinates of the platinum metals. It can be shown that coatings produced in this manner contain at least a proportion of the platinum metal in the form of its oxides and that with the more easily oxidised platinum metals, e.g., ruthenium, and a firing temperature in the upper half of the said temperature range, the resultant coating consists substantially of the oxides of the platinum metal.

The method of the aforesaid British specification is suitable for use with the present invention. The method may, however, be varied if desired by heating each coating of the platinum-bearing preparation first at a lower temperature to reduce the platinum metal compounds and produce a layer consisting substantially of the platinum metal and then in an oxidising atmosphere at a higher temperature, suitably at least 350°C, to convert the platinum metal at least in part to its oxides. For example a ruthenium chloride coating composition containing a reducing agent may first be heated at approximately 300°C to reduce the chloride substantially to ruthenium metal and the ruthenium coating may then be converted substantially completely to ruthenium dioxide by heating in air at approximately 450°C.

For the purpose of the present invention a coating of the oxides of one or more platinum metals on a film-forming metal support may also be formed directly from thermally decomposable compounds of the platinum metals, i.e., without intermediate reduction of the metals, by coating the support with a composition comprising compounds of the platinum metals and an organic vehicle but containing no reducing agent and heating in an oxidising atmosphere at a temperature higher than 300°C, preferably at least 350°C and most preferably about 450°C. For example, as taught in French Patent Specification No. 1,479,762, a coating of palladium oxide is formed directly on a film-forming metal support, e.g., titanium, by heating a coating consisting of an acidified solution of palladium chloride in isopropyl alcohol at 400°-500°C in an oxidising atmosphere, e.g., air, and a coating of the mixed oxides of palladium and iridium is formed directly on a tantalum support from a similar solution of the chlorides of palladium and iridium by heating in air at 300°-600°C.

For the purpose of the present invention the preformed oxides of the platinum metals may also be employed to produce the layer of operative electrode material. The preformed oxides may be applied to the film-forming metal support for example by any of the methods described in the aforesaid French patent specification, for instance by application in the molten state, by coating with a dispersion of the oxide in a liquid vehicle or by electrophoresis on to the film-forming metal support from a colloidal solution of the oxide. If desired to increase the initial adhesion the platinum metal oxide coating may be rolled or pressed into the support.

Although coatings consisting of platinum group metals at least in part in the form of their oxides are preferred, especially for electrodes that are to be used as anodes under the arduous conditions ruling in mercury-cathode cells electrolysing alkali metal chloride solutions, for less arduous conditions coatings consisting substantially of platinum group metals in the unoxidised state may be employed. Such coatings may be prepared by thermal decomposition of compounds of platinum group metals under reducing conditions throughout, for instance by applying to the support metal a solution of a platinum group metal salt in an organic solvent containing a reducing agent, e.g., linalool, and heating the coating in an atmosphere of a gas having an alkaline reaction, e.g., ammonia, and a reducing gas, e.g., methane, carbon monoxide, hydrogen or town gas, as taught in British Patent Specification No. 964,913.

It should be understood that with any of the coating methods described herein the coating steps may be repeated as necessary to build up a desired thickness of the operative electrode material before applying the film-forming metal oxide over it. Furthermore, when a final heating step in an oxidising atmosphere is employed to oxidise a coating of platinum group metal formed by thermal decomposition of a platinum group metal compound and the layer of operative electrode material is built up by superimposing a plurality of coatings, the oxidising step may be carried out in a single stage after all the coatings have been applied or if desired, particularly when building up relatively thick layers, the oxidising step may be carried out on each coating before applying the next or each time after applying a fraction of the total number of coatings greater than one coating, for instance after each second or third coating.

In general the coating of operative electrode material is applied to a chemically cleaned surface of the film-forming metal support. The support is degreased if necessary and then pickled, for instance in hot oxalic acid solution or in hot or cold hydrochloric acid. It is, however, possible to coat the operative electrode material on to a support which has been given an oxidising treatment, for instance by heating in air or by anodic treatment in an aqueous electrolyte, to produce a very thin surface layer of the film-forming metal oxide after the aforesaid cleaning treatment, and this oxide layer may even be beneficial in providing a better initial key for the operative electrode material, for instance when this is a preformed platinum group metal oxide in particulate form.

For use in the second coating step of the method according to the invention the thermally decomposable organo-compound of a film-forming metal must be one that is decomposable by heat alone, optionally in an oxidising atmosphere, e.g., air, or by heating after partial hydrolysis as for instance by exposure to moisture in the atmosphere during the coating operation, to form an oxide of the film-forming metal. Particularly suitable compounds are the alkyl titanates, alkyl polytitanates and alkyl halotitanates in which the halogen is chlorine, bromine or fluorine, and the corresponding compounds of the other film-forming metals. The titanium compounds are preferred when the support metal of the electrode is titanium or a titanium alloy. Very suitable compounds are those in which the alkyl groups contain two to four carbon atoms each. Other suitable thermally-decomposable compounds of the film-forming metals are, for example, resinates of the film-forming metals, as may be made for instance by reaction of a halide of the film-forming metal with a resinous material, e.g., abietic acid, in an organic solvent.

Methods of preparing alkyl titanates and preparing alkyl polytitanates (sometimes referred to as condensed alkyl titanates) by partial hydrolysis of alkyl titanates are disclosed in a paper by T. Boyd in Journal of Polymer Science, Vol. VII, No.6, 1951, pages 591–602. An alkyl chlorotitanate in the form of an alcoholic solution suitable for use in the method of the invention may be prepared by heating titanium tetrachloride with the chosen alcohol without employing any chemical means to remove the hydrogen chloride formed from the reaction mixture and using an excess of alcohol, suitably 2–5 times the amount theoretically required to remove all the chlorine atoms from the titanium tetrachloride. Alkyl bromotitanates and alkyl fluorotitanates may be prepared in similar manner starting with titanium tetrabromide and titanium tetrafluoride respectively.

The thermally-decomposable compound of a film-forming metal (exemplified hereinafter for simplicity by reference to alkyl titanates or halotitanates) in a liquid vehicle, suitably a volatile alcoholic solvent, may be applied by dipping, brushing or spraying on to the surface of the layer of operative electrode material which has previously been formed on the film-forming metal support. The coating is then suitably dried by heating in an oven at a moderate temperature, e.g., 100°–200°C, to evaporate the solvent, after which the coated electrode is heated at a higher temperature, for instance 250°–800°C, most suitably at approximately 450°C, to convert the organo-compound of the film-forming metal in the coating substantially to an oxide of the metal. Additional coats may be applied, dried and then decomposed by stronger heating in the same way, if necessary to obtain good coverage of the underlying operation electrode material.

When alkyl titanates and halotitanates are applied in thin coatings, it appears that some condensation takes place by hydrolysis caused by moisture in the atmosphere. When the condensed titanates are strongly heated they decompose substantially completely to leave a residue of titanium dioxide of vitreous appearance which serves to knit the operative electrode material securely to the underlying surface of the film-forming metal support. The time of heating to decompose the titanate should be shorter the higher the temperature employed, so as to avoid excessive reaction between the film-forming metal support and the coating or oxygen of the atmosphere. For example at a temperature of 500°C the time should not exceed about 15 minutes and at 800°C it should not exceed about 15 seconds. In this connection it should be noted that when the operative electrode material contains or consists of a platinum group metal oxide, the final heating step to decompose the titanate should be carried out in an oxidising atmosphere, e.g., air.

Electrodes produced according to the invention are useful in electrolytic cells, electrodialysis cells, fuel cells and in cathodic protection systems. Specific embodiments of these electrodes wherein the film-forming metal support is titanium and the coating on the titanium comprises one or more platinum group metal oxides and titanium dioxide have special advantages when used as anodes in the electrolysis of an alkali metal chloride solution.

The invention is further illustrated by the following working examples in which all parts are by weight.

EXAMPLE 1

A strip of titanium was immersed overnight in hot oxalic acid solution to etch the surface of the metal and was then washed and dried. A mixture containing ruthenium chloride 1 part, isopropyl alcohol 4 parts and linalool 1.3 parts was painted on to the titanium, the coating of paint was allowed to dry in air for 10 minutes and was then heated in a furnace in air at 300°C for 10 minutes to form a coating consisting substantially of ruthenium. Two further coats of the paint were applied, dried and heated in the same manner. The ruthenium-coated titanium was then heated in air at 450°C for 1 hour to oxidise at least the outermost part of the ruthenium layer and was allowed to cool. A solution of ethyl chlorotitanate in ethyl alcohol was prepared by heating 1 part of titanium tetrachloride with 5 parts of absolute ethyl alcohol at 70°C for 15 minutes. Three coats of this solution were applied to the prepared titanium strip over the ruthenium oxide coating, each coating being dried in an oven at 150°C for 10 minutes and then heated in air in a furnace at 450°C for 15 minutes to form a surface layer of smooth vitreous appearance.

EXAMPLE 2

A coating of ruthenium was formed on a strip of titanium and the coating was then oxidised in air at 450°C for 1 hour, all as in Example 1. The weight of the coating then amounted to about 6 g/m$^2$ of the titanium surface, calculated as ruthenium metal. Eight coats of a solution consisting of 5 parts of tetra-n-butyl titanate in 5 parts of n-pentanol were then painted on to the coated titanium, each coat being dried in an oven at 200°C for 10 minutes and then heated in air at 450°C for 15 minutes. The theoretical weight of titanium dioxide thus formed on the electrode was 25 g/m$^2$.

EXAMPLE 3

A ruthenium coating was formed on a strip of titanium and oxidised in air at 450°C, all as in Example 1 to give a coating amounting to about 6 g/m$^2$ of the titanium surface, calculated as ruthenium metal. A solution of isopropyl chlorotitanate in isopropyl alcohol was prepared by heating 1 part of titanium tetrachloride with 5 parts of isopropyl alcohol for 1 hour at 70°C. Four coats of this solution were then painted on to the coated titanium, each coat being dried in an oven at 200°C for 10 minutes and then heated in air in a furnace at 450°C for 15 minutes. The theoretical weight of titanium dioxide thus formed on the electrode was about 8 g/m$^2$.

EXAMPLE 4

A strip of titanium was etched, washed and dried as in Example 1 and was then coated with the same ruthenium chloride paint composition as in that Example, i.e., ruthenium chloride 1 part, isopropyl alcohol 4 parts, linalool 1.3 parts. Three coats of the paint composition were applied (equivalent coating weight about 6 g/m$^2$ calculated as ruthenium metal) but this time after being allowed to dry for 10 minutes in air each coat was heated once only, in air at 350°C for 1 hour, to form a coating consisting substantially of ruthenium dioxide. Four coats of a solution of isopropyl chlorotitanate were then applied and converted to titanium dioxide as in Example 3.

EXAMPLE 5

A strip of titanium was pretreated and given three coats of a ruthenium chloride paint composition as described in Example 4 except that after being allowed to dry each coat was converted substantially to ruthenium dioxide by heating once only, in air at 450°C for 1 hour. Eight coats of a solution of tetra-n-butyl titanate in n-pentanol were then applied, each coat being dried in an oven at 200°C for 10 minutes and then heated in air in a furnace at 450°C for 15 minutes. The theoretical weight of titanium dioxide thus formed on the electrode was 35 g/m$^2$.

EXAMPLE 6

A strip of titanium was etched, washed and dried as in Example 1 and was then given three coats of a ruthenium chloride paint composition containing no reducing agent (composition: ruthenium trichloride 1 part, isopropyl alcohol 4 parts). Each coat was allowed to dry in air for 10 minutes and was then heated in air at 350°C for 1 hour to form a coating consisting substantially of ruthenium dioxide. Six coats of a solution of isopropyl chlorotitanate in isopropyl alcohol were then applied to the coated titanium, each coat being dried in air in an oven at 200°C and then heated in air in a furnace at 450°C for 15 minutes. The theoretical weight of titanium dioxide thus formed on the electrode was 15 g/m$^2$.

EXAMPLE 7

A suspension of ruthenium dioxide particles, mostly of size less than 4 microns diameter, in n-pentanol was brushed on to a strip of titanium which had been etched, washed and dried as in Example 1 and the solvent was evaporated from the coating in an oven at 150°–200°C. Two further coats were applied and dried in the same manner to give a total loading of 7g ruthenium dioxide/m$^2$ of the coated titanium surface. A solution of tetra-n-butyl titanate in n-propyl alcohol was then sprayed on to the ruthenium dioxide coating and the titanate coating was dried in air in an oven for 10 minutes at 200°C and then heated in air in a furnace for 15 minutes at 450°C. Seven further coats of the titanate solution were applied, each one being dried at 200°C and heated at 450°C as for the first coat. The theoretical amount of titanium dioxide thus formed on the electrode was 35 g/m$^2$.

Electrodes produced according to each one of the foregoing Examples were tested as anodes in sodium chloride brine containing 21.5 percent NaCl by weight at 65°C in an electrolysis cell with a mercury cathode, and at an anodic current density of 8 kA/m$^2$ they showed chlorine overpotentials in the range 25–76 mV. Each anode was also dipped into the sodium amalgam cathode with a potential of about 5 volts still applied between the anode and the amalgam. The short-circuit current was found to be relatively small — less than 10 amps compared with an anode of the same size consisting of titanium coated by firing thereon a coating of a platinum-bearing preparation according to the prior art but with no further treatment, which passed a current of 400 amps under the same short-circuit conditions. This demonstrates one special advantage of an electrode prepared according to the invention, in that such an electrode develops a resistance to short-circuit currents in the cell and provides its own protection against damage by accidental short-circuit in use.

EXAMPLE 8

A strip of titanium was immersed overnight in hot oxalic acid solution to etch the surface of the metal and was then washed and dried. A ruthenium chloride paint composition was prepared by dissolving overnight 2.5 parts of ruthenium chloride in 10 parts of n-pentanol and adding 3.25 parts of linalool immediately before use. An alkyl titanate paint composition was made by mixing 10 parts of tetra-n-butyl titanate with 10 parts of n-pentanol. A layer of ruthenium dioxide was deposited on the titanium strip by spraying on a coating of the ruthenium chloride paint, drying the coating in an oven at 180°C for 10 minutes and then firing it by heating the coated strip in air in a furnace at 450°C for 15 minutes. Two thin layers of titanium dioxide were then superimposed on the ruthenium dioxide layer, each one being produced by spraying on the alkyl titanate paint composition, then drying and firing the coating in the same manner as the ruthenium chloride paint. The sequence of depositing one ruthenium dioxide layer followed by two titanium dioxide layers was then twice repeated to give a total deposite on the titanium surface of approximately 6 g/m² of ruthenium dioxide and 9 g/m² of titanium dioxide.

The electrode thus produced provided to have a high resistance to loss of the active coating when submitted to electrical shorting to a sodium amalgam cathode in the test described with reference to the preceding Examples and it was still capable of operating as an anode at an anodic current density of 8 kA/m² without significant increase in cell voltage after the short-circuiting test.

We claim:

1. A method for the manufacture of an electrode for use in electrochemical processes, which comprises the steps of (1) applying to a support member made of a film-forming metal selected from the group consisting of titanium, zirconium, niobium, tantalum and tungsten or an alloy consisting principally of one of these metals, a layer of an operative electrode material resistant to electrochemical dissolution, and (2) applying over the said layer a coating comprising a thermally decomposable organo-compound of a film-forming metal in a liquid vehicle and heating the coating so as to convert the organo-compound of the film-forming metal to an oxide of the film-forming metal, the sequence of said steps (1) and (2) being repeated a plurality of times.

2. A method according to claim 1, wherein the total weight of operative electrode material and film-forming metal oxide deposited on the film-forming metal support member is in the range 10–15g/m² of the coated surface.

3. A method according to claim 1, wherein each of the steps (1) consists of a coating operation carried out a plurality of times to build up a thickness of operative electrode material.

4. A method according to claim 1, wherein each of the steps (2) consists of a plurality of said coating and heating operations whereby a thickness of film-forming metal oxide is built up.

5. A method according to claim 1, wherein in each of the steps (1) the operative electrode material is ruthenium dioxide, in each of the steps (2) the thermally-decomposable organo-compound of a film-forming metal is a resinate and the support member is made of titanium or an alloy based on titanium and having anodic polarisation properties similar to those of titanium.

6. A method according to claim 1, wherein in each of the steps (1) the operative electrode material is ruthenium dioxide, in each of the steps (2) the thermally-decomposable organo-compound of a film-forming metal is an alkyl titanate, an alkyl polytitanate or an alkyl halotitanate in which the halogen is chlorine, bromine or fluorine and the support member is made of titanium or an alloy based on titanium and having anodic polarisation properties similar to those of titanium.

7. A method according to claim 6 wherein step (2) comprises drying the coating by heating at 100°–200°C and then heating at 250°–800°C to convert the organo-compound to an oxide of the film-forming metal.

* * * * *